United States Patent [19]
Blasiak et al.

[11] Patent Number: 5,706,313
[45] Date of Patent: Jan. 6, 1998

[54] SOFT DECISION DIGITAL COMMUNICATION METHOD AND APPARATUS

[75] Inventors: Dariusz Andrzej Blasiak, Chicago; John William Arens, Grayslake, both of Ill.

[73] Assignee: Motorola, Inc., Schaumburg, Ill.

[21] Appl. No.: 332,680

[22] Filed: Nov. 1, 1994

[51] Int. Cl.$^6$ ............... H03D 3/22; H04L 24/22
[52] U.S. Cl. ............... 375/330; 375/341; 371/43
[58] Field of Search ............... 375/283, 330, 375/341, 262, 331; 371/43

[56] References Cited

U.S. PATENT DOCUMENTS

| | | | |
|---|---|---|---|
| 4,742,533 | 5/1988 | Weidner et al. | 375/331 |
| 5,134,635 | 7/1992 | Hong et al. | 375/341 |
| 5,204,874 | 4/1993 | Falconer et al. | 370/22 |
| 5,214,675 | 5/1993 | Mueller et al. | 375/330 |
| 5,379,324 | 1/1995 | Mueller et al. | 375/330 |

*Primary Examiner*—Stephen Chin
*Assistant Examiner*—T. Ghebretinsae
*Attorney, Agent, or Firm*—Daniel W. Juffernbruch

[57] ABSTRACT

A decoding apparatus (200) decodes a coherent, differentially encoded multi-level phase shift keying (DEPSK) modulated signal. A coherent receiver (101) receives and, subsequently, outputs the coherent DEPSK modulated signal to a metric computer (201). The metric computer (201) generates a soft decision metric $\hat{\Lambda}(\bar{s}(n))$ corresponding to the coherent DEPSK modulated signal which is outputted to a forward error correction (FEC) decoder (107). The FEC decoder (107) decodes the coherent DEPSK modulated signal in accordance with the soft derision metric $\hat{\Lambda}(s(n))$ corresponding to the coherent DEPSK modulated signal.

21 Claims, 2 Drawing Sheets

—PRIOR ART—

SOFT DECISION DIGITAL COMMUNICATION METHOD AND APPARATUS

BACKGROUND OF THE INVENTION

1. Field of the Invention

The present invention relates generally to digital communication systems employing FEC (Forward Error Correction) and, more specifically, to a method and apparatus for decoding received coherent, differentially encoded MPSK (Multi-level Phase-Shift Keying) modulated signals via a soft decision metric.

2. Description of the Related Art

Due to the rapid growth of the cellular telephone industry, digital communication systems, because of their benefits in system capacity and performance, have begun to be widely used as the standard for many current and future systems. A method commonly used in digital communication systems to improve upon the BER (bit error rate) is FEC (forward error correction), whereby redundancy is added to the transmitted signal in order to increase the transmitted signals immunity to channel noise. FEC decoding methods vary greatly and are often dependent upon the modulation scheme used.

Digital communication systems have the option of utilizing various modulation methods. One such modulation method is multi-level phase-shift keying (MPSK), which is commonly used due to its spectral efficiency and bit error rate (BER) performance. MPSK is a modulation strategy whereby the information is stored in the phase of the transmitted signal. The phase of each transmitted symbol can take on one of $2^M$ possible values, where M denotes the modulation order. Examples of various orders of MPSK are binary phase-shift keying (BPSK) (M=2) and quadrature phase-shift keying (QPSK) (M=4). Two general methodologies for detecting MPSK modulated signals are coherent detection and noncoherent detection. For coherent detection, a means by which to obtain an estimate for the phase reference of the received signal is required. No such phase reference is required for noncoherent detection, although a means by which to make the transmitted signal relatively immune to phase shifts is essential. The most common means by which this is accomplished is to differentially encode the transmitted signal at the transmitter and subsequently differentially decode the received signal at the receiver. Differentially encoding is the process of mapping the information into the phase difference of two adjacent symbols as opposed to mapping the information into the absolute phase of each symbol, as is the case with MPSK. An MPSK system that employs differential encoding and noncoherent detection at the receiver is called differential phase-shift keying (DPSK), where the M is excluded as a notational convenience. Alternatively, an MPSK system that employs differential encoding and coherent detection at the receiver is called differential-encoded phase-shift keying (DEPSK).

Various digital communication systems, such as terrestrial cellular systems (e.g., United States Digital Cellular or USDC), commonly employ DPSK modulation, mainly because of the simplicity of noncoherent receiver design. Other digital communication systems, such as low earth orbit (LEO) satellite systems, employ DEPSK modulation for reasons such as severe power constraints on the satellites and the need to deal with substantial Doppler frequency offsets.

FIG. 1 is a block diagram illustrating a known apparatus for decoding the DEPSK modulated signals. The apparatus of FIG. 1 is configured to decode QPSK modulated signals. In a QPSK modulation scheme, the transmitter modulates a carrier signal, having in-phase (I) and quadrature (Q) components, in a manner defined by the symbols encoded into the signal. Each bit of the symbols modulates one of the I or Q components so that at the transmitter only one of four possible phase relationships exists between the I and Q components. During transmission, the information contained in the QPSK modulated carrier signal becomes corrupted by noise, such as additive white Gaussian noise (AWGN). In systems that transmit information via radio frequencies (RF), such as cellular systems, the transmitted signal also tends to be faded due to constructive and destructive interference of the received multi-path signal. Fading has the effect of distorting both the amplitude and phase of the received signal.

The QPSK modulated signal is received by a coherent receiver 101 and demodulated and sampled at the symbol rate to provide digital samples of the I and Q components of the received symbol sequence. The received symbols are coupled through a quantizer 103, which performs quantization or provides a decoding algorithm that makes a symbol decision; that is, decides what symbol was transmitted in spite of the fact that the received symbol invariably has been corrupted by noise. After quantization, the symbol decisions are coupled through a differential decoder 105 to a forward error correction (MEG) decoder 107. The FEC decoder 107, which may utilize a Viterbi algorithm, decodes the encoded data of the received symbol sequence in accordance with the quantized symbols. Since quantization (i.e., symbol decisions) of the received symbols has been performed prior to the FEC decoder, such a strategy is known in the prior art as a hard decision decoding technique.

A hard decision FEC decoding algorithm is one that takes as input and operates on received symbols which have been quantized to one of the possible transmitted symbols. For QPSK, such a quantization maps the I and Q components of each received symbol as a vector in a two-dimensional vector space defined by axes I and Q (which is equivalent to the complex plane). The transmitter modulates the carrier (in QPSK modulation) in accordance with only one of four possible symbols to be transmitted. Each one of the four possible symbols is additionally mapped as a vector at a point centrally located in a corresponding one of the four quadrants of the I-Q vector space. The quantizer 103 computes the distances between the vector describing the I and Q components of each received symbol and each one of the four vectors describing the possible transmitted symbols. Quantiization noise is introduced as a result of making such symbol decisions by moving the vectors describing the I and Q components of each received symbol to the closest one of the four vectors describing the possible transmitted symbols.

A soft decision FEC algorithm is one that employs any metric, or measure, that, by some means, associates a degree of confidence to the symbol derision, whereby the fidelity in such a confidence measure is greater than that obtained from a hard decision quantization. Soft derision FEC decoding typically yields improved BER performance over that exhibited by hard decision FEC decoding.

Known apparatuses that decode DEPSK modulated signals quantize or make symbol decisions too early in the decoding process. The apparatus illustrated in FIG. 1 makes symbol decisions prior to the differential decoder 105. Although later processing may be made easier because, for example, samples do not need to be stored in high precision memory, BER performance is degraded. Thus, soft decision information that could be used to improve the performance of the FEC decoder 107 is lost at quantization.

Therefore, what is needed is an apparatus for decoding DEPSK modulated signals that couples soft decision information directly to an FEC decoder.

DETAILED DESCRIPTION OF THE PREFERRED EMBODIMENTS

The invention disclosed herein encompasses an apparatus for decoding a coherent, differentially-encoded multi-level phase shift keying (DEPSK) modulated signal. The decoding apparatus comprises a coherent receiver for receiving the coherent DEPSK modulated signal. The decoding apparatus further comprises a metric computer, coupled to the coherent receiver, for generating a soft decision metric corresponding to the coherent DEPSK modulated signal. The decoding apparatus additionally comprises a forward error correction (FEC) decoder, coupled to the metric computer, for decoding the coherent DEPSK modulated signal in accordance with said soft decision metric corresponding to the coherent DEPSK modulated signal.

Figure 1:
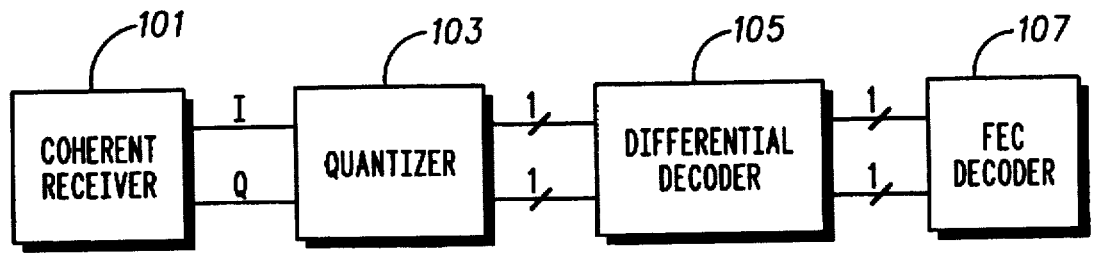
FIG. 1 is a block diagram illustrating a known apparatus for decoding coherent, differentially encoded MPSK modulated signals.
Figure 2:
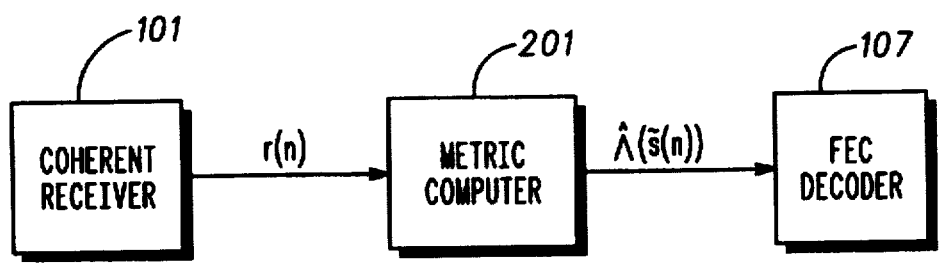
FIG. 2 is a block diagram illustrating an apparatus for decoding coherent, differentially encoded MPSK modulated signals in accordance with the present invention.

FIG. 2 is a block diagram illustrating a decoding apparatus 200 of a communication system for decoding coherent DEPSK modulated signals in accordance with the present invention. Although preferably for use in subscriber units and satellites of a satellite communication system, the decoding apparatus 200 may comprise a portion of the receiving circuitry of any digital receiver utilizing DEPSK modulation. The decoding apparatus 200 includes the coherent receiver 101 and the forward error correction (FEC) decoder 107 previously disclosed with respect to FIG. 1. However, rather than utilizing the quantizer 103 and the differential decoder 105 of FIG. 1, the decoding apparatus 200 couples a metric computer 201 between the coherent receiver 101 and the FEC decoder 107.

The coherent receiver 101 receives a coherent DEPSK modulated signal transmitted by a transmitter. Prior to transmission, data to be transmitted is, first, encoded by an FEC encoder and mapped into symbols, wherein the number of different symbols depends upon the type of modulation being used in the communication system. For example, multi-level phase shift keying (MPSK) modulation utilizes M different symbols, while quadrature phase shift keying (QPSK) modulation utilizes only 4 different symbols. Next, the symbol encoded data is differentially encoded so as to combat unwanted frequency rotation between symbols and "sector slip" due to possible Doppler frequency shifts during transmission. The resulting differentially encoded signal transmitted to the coherent receiver 101 by the transmitter may be represented by the following:

$$\sqrt{2P}\ d(n)$$

where
n represents a discrete time interval;
P represents the average power; and d(n), the differentially encoded sequence, is defined by the following functional equation:

$$d(n) = \begin{cases} 1 & \text{for } n = 0 \\ s(n)d(n-1) & \text{for } 1 \leq n \leq N \end{cases} \quad (1)$$

where
N represents the length of the received signal; and
s(n) represents the actual (FEC encoded) transmitted symbol, which may be any one of the possible symbols denoted by the following set:

$$s(n) \in \{e^{-j\frac{2\pi}{M}k} : k \in \{0,1,\ldots,M-1\}\}.$$

Upon reception by the coherent receiver 101, the differentially encoded transmitted signal is coupled through a filter and a downsampler contained therein. Because the received differentially encoded transmitted signal is downsampled at the symbol rate, the downsampler outputs a single received symbol during each discrete time interval. The single received symbol may be referred to as the present received symbol r(n) which may be represented by the following equation:

$$r(n) = \sqrt{2P}\ d(n) + w(n) \quad (2)$$

where
w(n) represents Gaussian noise acquired during transmission.

Prior to outputting the present received symbol r(n), the coherent receiver 101 compensates the present received symbol r(n) for Doppler frequency shifts by, first, estimating both the phase and frequency offset of the present received symbol r(n) via a phase estimator and then mixing the present received symbol r(n) with a conjugated output from the phase estimator. Additional compensation may also be provided for short-term channel fading. The present received symbol r(n), now compensated, is outputted to the metric computer 201.

The metric computer 201 generally compares the present received symbol r(n) to a set of all of the possible transmitted symbols, in an attempt to discern the actual transmitted symbol s(n). In order to make this comparison, the metric computer 201 is executed multiple times during each discrete time interval. The number of times the metric computer 201 is executed depends on the type of modulation used in the communication system. For MPSK modulated signals in which there are a total of M possible transmitted symbols, the metric computer 201 must be run M times for each discrete time interval. For the 4 different symbols used in QPSK modulation, the metric computer 201 need only be run 4 times for each discrete time interval.

For compatibility with known FEC decoders, such as FEC decoder 107, and the Viterbi decoding algorithm which may be used therein, the metric computer 201 outputs soft decision information in terms of the correspondence between the possible transmitted symbols and the actual transmitted symbol s(n). More specifically, for each one of the possible transmitted symbols the metric computer 201 outputs a likelihood value reflecting a degree of confidence that the actual transmitted symbol s(n) embodied within the present received symbol r(n) is that specific one of the possible transmitted symbols. Therefore, at the conclusion of the discrete time interval of the present received symbol r(n) in which the metric computer 201 has been executed multiple times in accordance with the type of modulation used, a series of the likelihood values corresponding to the possible transmitted symbols are outputted as a row or column in an output matrix $\hat{\Lambda}(\tilde{s}(n))$.

For example, the output matrix $\hat{\Lambda}(\tilde{s}(n))$ of the present received symbol r(n) in a QPSK modulation scheme, wherein the possible transmitted symbols comprise the set {1, -j, -1, j}, may be represented by a 1×4 dimensioned matrix of likelihood values, such as [4 2 5 7]. The columns of the 1×4 dimensioned matrix [4 2 5 7] are defined by each of the symbols of the set {1, -j, -1, j} so as to directly relate to the respective likelihood that the actual transmitted symbol s(n) corresponds to each of the possible transmitted symbols, {1, -j, -1, j}. That is, the (1,1) location of the 1×4 dimensioned matrix corresponds to symbol 1, the (1,2) location corresponds to symbol -j, the (1,3) location corresponds to symbol -1, and the (1,4) location corresponds to symbol j. The FEC decoder 107 may then interpret the output matrix $\hat{\Lambda}(\tilde{s}(n))$, [4 2 5 7], such that j is most likely the identity of the actual transmitted symbol s(n), -1 is less likely the identity, 1 is even less likely, and symbol -j is least likely the identity of the actual transmitted symbol s(n).

The previous example reveals a portion of the output matrix $\hat{\Lambda}(\tilde{s}(n))$ formed in accordance with the present received symbol r(n) during one discrete time interval. At the conclusion of all of the discrete time intervals, the output matrix $\hat{\Lambda}(\tilde{s}(n))$ contains likelihood values for all of the symbols of the received signal. The output matrix $\hat{\Lambda}(\tilde{s}(n))$ in its entirety embodies the soft decision metric.

The output matrix $\hat{\Lambda}(\tilde{s}(n))$, outputted to the FEC decoder 107, is sized according to the number of symbols comprising the differentially encoded signal $\sqrt{2P}d(n)$ transmitted to, and received by, the coherent receiver 101. For example, if the differentially encoded signal $\sqrt{2P}d(n)$ is modulated in accordance with MPSK modulation and has a length of 100 symbols, at the conclusion of 100 discrete time intervals, the output matrix $\hat{\Lambda}(\tilde{s}(n))$ will be dimensioned 100×M. Similarly, for QPSK modulation, the differentially encoded signal $\sqrt{2P}d(n)$ having 100 symbols will be dimensioned 100×4.

As previously mentioned, the soft derision algorithm implemented by the metric computer 201 couples the output matrix $\hat{\Lambda}(\tilde{s}(n))$ in terms of the actual transmitted symbol s(n) to the FEC decoder 107. This allows the metric computer 201 to be compatible with most FEC decoders utilizing Viterbi algorithms. The decoding apparatus 200 of FIG. 2 improves upon known decoding apparatuses, such as that disclosed in reference to FIG. 1, by not requiring a differential decoder, such as differential decoder 105; that puts the received signal in terms of the actual transmitted symbol s(n) necessary for compatibility with the FEC decoder 107. As a result, unlike the known apparatus of FIG. 1, the decoding apparatus 200 of FIG. 2 according to the present invention is able to improve decoding performance of the FEC decoder by providing soft decision information directly thereto.

Figure 3:
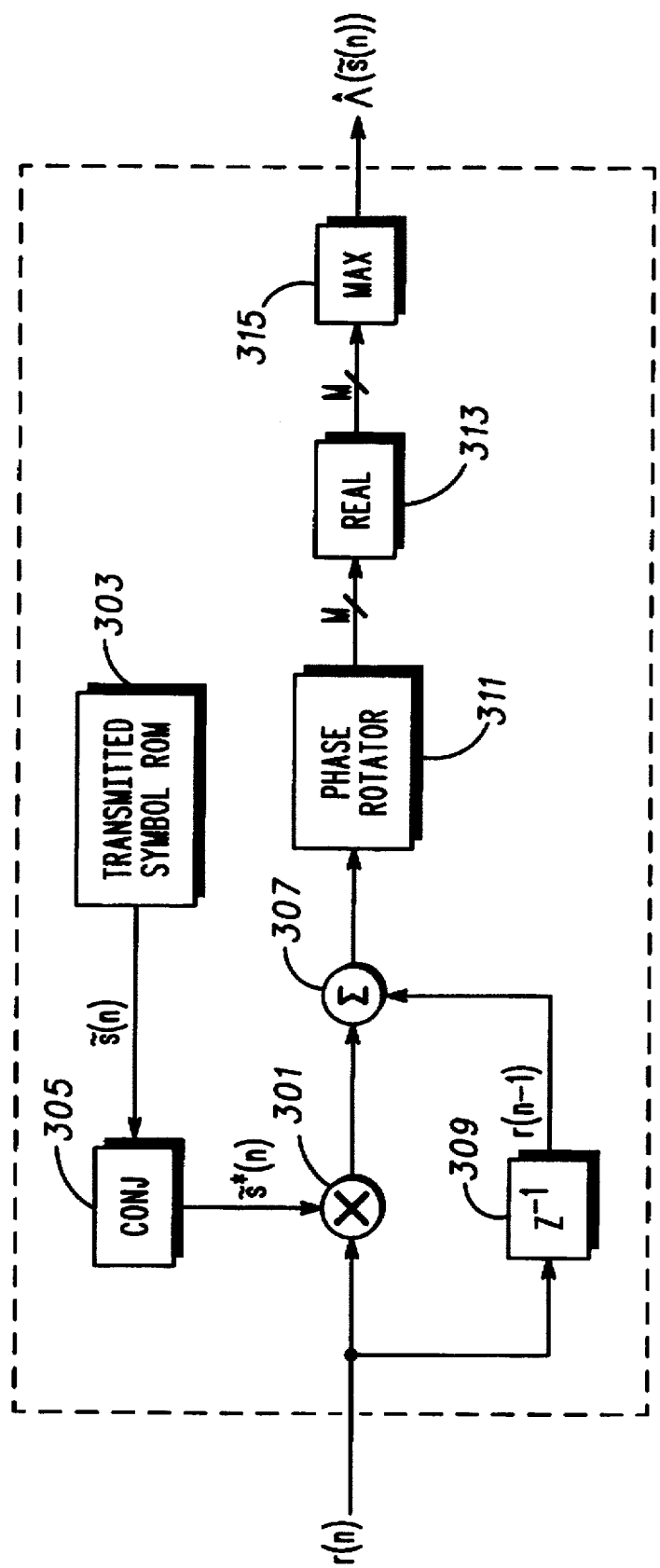
FIG. 3 is a block diagram illustrating the metric computer block of FIG. 2 in accordance with the present invention.

FIG. 3 is a block diagram illustrating, more specifically, the operation of the metric computer 201 in accordance with the present invention. The present received symbol r(n) outputted by the coherent receiver 101 of FIG. 2 is coupled to a mixer 301. The mixer 301 mixes the present received symbol r(n) with a conjugate of a present one of the possible transmitted symbols provided by a read-only memory (ROM) 303. The ROM 303 contains a predetermined set of all of the possible transmitted symbols for the particular modulation scheme utilized by the communication system. For MPSK modulation schemes, M possible transmitted symbols are stored within the ROM 303, whereas for QPSK only 4 possible transmitted symbols are stored within the ROM 303. The ROM 303 couples a present one of the possible transmitted symbol $\tilde{s}(n)$ to a complex conjugate converter 305 within the metric computer 201. The complex conjugate converter 305 outputs a conjugate of the present one of the possible transmitted symbols $\tilde{s}^*(n)$ to the mixer 301. The mixer 301 mixes the present received symbol r(n) with the conjugate of the present one of the possible transmitted symbols $\tilde{s}^*(n)$ to generate a rotated received symbol $\tilde{s}^*(n)r(n)$ that is further coupled to a summer 307.

The present received symbol r(n) is also fed into to a delayer 309 coupled between the mixer 301 and the summer 307. The delayer 309 functions to delay the present received symbol r(n) one discrete time interval. At the conclusion of one discrete time interval, the delayer 309 couples a previous received symbol r(n-1) to the summer 307.

The basis for mixing the present received symbol r(n) and the conjugate of the present one of the possible transmitted symbols $\tilde{s}^*(n)$ to create the rotated received symbol $\tilde{s}^*(n)r(n)$ at the mixer 301 is to create a workable approximation of the previous received symbol r(n-1). The aforementioned equation (2) suggests that the present received symbol r(n) is directly related to the differentially encoded sequence d(n). Furthermore, equation (1) reveals that the differentially encoded sequence d(n) equals s(n)d(n-1) for all discrete time intervals beyond the first time interval (note that no symbol is being transmitted in the first discrete time interval (n=0)). Consequently, it follows that $$r(n)=s(n)r(n-1)$$

and, thus, that $$r(n)s^*(n)=r(n-1).$$

Therefore, if the conjugate of the present one of the possible transmitted symbols $\tilde{s}^*(n)$ corresponds to a conjugate of the actual transmitted symbol s * (n), then the rotated received symbol $\tilde{s}^*(n)r(n)$ will approximately correspond to the previous received symbol r(n-1). Or similarly, if the present one of the possible transmitted symbol $\tilde{s}(n)$ corresponds to the actual transmitted symbol s(n), then the rotated received symbol $\tilde{s}^*(n)r(n)$ will approximately correspond to the previous received symbol r(n-1).

The first step in determining whether the rotated received symbol $\tilde{s}^*(n)r(n)$ approximately corresponds to the previous received symbol r(n-1) involves summing the rotated received symbol $\tilde{s}^*(n)r(n)$ and the previous received symbol r(n-1) via the summer 307. Summing the rotated received symbol $\tilde{s}^*(n)r(n)$ and the previous received symbol r(n-1) creates a resultant received symbol $\tilde{s}^*(n)r(n)+r(n-1)$. Both the rotated received symbol $\tilde{s}^*(n)r(n)$ and the previous received symbol r(n-1) can be realized as vectors. Vector addition of two approximately similar vectors pointing in the same direction results in a resultant vector that is approximately twice the length of the initial vectors. As a result, the magnitude of the resultant received symbol $\tilde{s}^*(n)r(n)+r(n-1)$, or more appropriately, the length of the vector thereof, is directly related to the degree of correctness in identifying whether the present one of the possible transmitted symbols $\tilde{s}(n)$ provides the best estimate for the actual transmitted symbol s(n). The mixer 301, the delayer 309, and the summer 307 may collectively form a combiner circuit. Unlike known soft decision algorithms that typically only analyze the present received symbol, the soft decision algorithm of the metric computer 201 utilizes both the present received symbol r(n) and the previous received symbol r(n−1) to determine the identity of the actual transmitted symbol s(n).

Next, the resultant received symbol s̃*(n)r(n)+r(n−1) is coupled to a phase rotator 311. The phase rotator 311 rotates the resultant received symbol s̃*(n)r(n)+r(n−1) over all of the possible transmitted symbols. The phase rotator 311 may be realized by a series of parallel mixers that mix the resultant received symbol s̃*(n)r(n)+r(n−1) with all of the possible transmitted symbols so as to generate rotated resultant received symbols. If MPSK modulation is being utilized, M rotated resultant received symbols are generated. The M rotated resultant received symbols may be defined by the following equation:

$$[r(n)\tilde{s}^*(n) + r(n-1)]e^{-j\frac{2\pi k}{M}}, k \in \{0,1,\ldots,M-1\}$$

where $$e^{-j\frac{2\pi k}{M}} \text{ for } k=0,1,\ldots,M-1$$

represents all of the M possible transmitted symbols. The rotated resultant received symbols, which are vectors of various lengths, represent likelihoods that the present one of the possible transmitted symbols s̃(n) is the actual transmitted symbol s(n). The rotated resultant received symbol closest in the vector space to one of all of the possible transmitted symbols will represent the best choice for the identity of the actual transmitted symbol s(n) with respect only to the present one of the possible transmitted symbols s̃(n). The rotated resultant received symbols are outputted to a real operator 313 via a first bus having at least M capacity.

The real operator 313 extracts the real portion or the in-phase component of each of the rotated resultant received symbols. This may be represented by the following equation:

$$Re\{[r(n)\tilde{s}^*(n) + r(n-1)]e^{-j\frac{2\pi k}{M}}\}, k \in \{0,1,\ldots,M-1\}$$

The real operator 313 outputs the real portion of each of the rotated resultant received symbols to a maximizer 315 via a second bus having at least M capacity.

The maximizer 315 identifies which of the rotated resultant received symbols has the maximum real part and, as previously specified, is the best choice for the identity of the actual transmitted symbol s(n) with respect only to the present one of the possible transmitted symbols s̃(n). The operation of the maximizer 315 may be represented by the following equation:

$$\max_k \{Re\{[r(n)\tilde{s}^*(n) + r(n-1)]e^{-j\frac{2\pi k}{M}}\}\}, k \in \{0,1,\ldots,M-1\}$$

The maximum rotated resultant received symbol is outputted to a first entry of a row in the out-put matrix Â(s̃(n)). The phase rotator 311 and the real operator 313 may form a multiple phase angle circuit, and the multiple phase angle circuit and the maximizer 315 may collectively form a maximum phase detector.

Aside from being executed for each present received symbol r(n) provided by the coherent receiver 101 during each discrete time interval via downsampling, the medic computer 201 is executed multiple times within the same discrete time interval to permit comparison to each of all of the possible transmitted symbols. The soft derision metric outputted to the FEC decoder 107 in the output matrix Â(s̃(n)) can best be described as a set of best choices for, or likelihoods of, correspondence between all of the actual transmitted symbols and all of the possible transmitted symbols.

In summary, the invention disclosed in the aforementioned includes an assembly for, and method of, decoding actual transmitted symbols contained within a DEPSK modulated signal. The assembly includes a coherent receiver for receiving and, subsequently, downsampling (at the symbol rate) the coherent DEPSK modulated signal so as to output a single present received symbol during each time interval. Coupled to the coherent receiver is a metric computer which generates a soft decision metric corresponding to the actual transmitted symbols from the received symbols supplied by the coherent receiver during each time interval. The metric computer mixes the single present received symbol with a conjugate of a present one of all of the possible transmitted symbols to form a rotated symbol. In addition, a delayer is further coupled to the input of the metric computer for delaying the single present received symbol one time interval so as to out-put a single previous received symbol of the coherent DEPSK modulated signal. The single previous received symbol and the rotated symbol are then summed to form a resultant symbol that may identify a present one of the actual transmitted symbols. The resultant symbol is then subjected to a phase rotator that rotates the resultant symbol over each one of all of the possible transmitted symbols so as to create a set of likelihoods that further define the possibility that the present one of all of the possible transmitted symbols is the present one of the actual transmitted symbols. The set of likelihoods are coupled to a real operator for extracting the real portion thereof and a maximizer for determining a maximum likelihood from among the set of likelihoods. The maximum likelihood forms a portion of the soft decision metric. The metric computer is executed multiple times within each time interval to compare the single present received symbol to all of the possible transmitted symbols. At the conclusion of comparing all of the sampled symbols comprising the coherent DBPSK modulated signal, the soft decision metric is outputted to an FEC decoder in the form of a matrix containing likelihoods that each of the possible transmitted signals correspond to each of the actual transmitted symbols.

Although the invention has been described and illustrated in the above description and drawings, it is understood that this description is by example only and that numerous changes and modifications, such as, replacing the phase rotator, the real operator, and the maximizer with a real operator and an imaginary operator functioning in parallel, a maximizer, and an absolute value operator for generating a maximum likelihood, can be made by those skilled in the art without departing from the true spirit and scope of the invention.

What is claimed is:

1. An assembly for decoding a coherent differentially encoded multi-level phase shift keying (DEPSK) modulated signal representing actual transmitted symbols, the assembly comprising:

a coherent receiver for receiving the coherent DEPSK modulated signal;

a metric computer, coupled to said coherent receiver, for generating a soft decision metric corresponding to the actual transmitted symbols, the metric computer including a mixer, operatively coupled to said coherent receiver, for combining a present symbol of the coherent DEPSK modulated signal with a present predetermined symbol from a set of predetermined symbols; and a forward error correction (FEC) decoder, coupled to said metric computer, for decoding the coherent DEPSK modulated signal in accordance with the soft decision metric.

2. An assembly according to claim 1 wherein said metric computer further comprises a delayer, operatively coupled to said coherent receiver, for delaying a present symbol of the coherent DEPSK modulated signal one time interval and generating a previous symbol of the coherent DEPSK modulated signal.

3. An assembly according to claim 2 wherein said metric computer further comprises a summer, coupled to both said mixer and said delayer, for combining the present symbol of the coherent DEPSK modulated signal and the present predetermined symbol with the previous symbol of the coherent DEPSK modulated signal to form a resultant symbol.

4. An assembly according to claim 3 wherein said metric computer further comprises a phase rotator, coupled to said summer, for rotating the resultant symbol over each one of the set of predetermined symbols so as to create a set of likelihoods that the present predetermined symbol is the present one of the actual transmitted symbols.

5. An assembly according to claim 4 wherein said metric computer further comprises a real operator, coupled to said phase rotator, for extracting a real portion of each one of the set of likelihoods that the present predetermined symbol is the present one of the actual transmitted symbols.

6. An assembly according to claim 5 wherein said metric computer further comprises a maximizer, coupled to said real operator, for determining a maximum likelihood from among the set of likelihoods, the maximum likelihood forming a portion of the soft decision metric.

7. An assembly for decoding a coherent differentially encoded multi-level phase shift keying (DEPSK) modulated signal representing actual transmitted symbols, the assembly comprising:

a coherent receiver for receiving the coherent DEPSK modulated signal;

a metric computer, coupled to said coherent receiver, for generating a soft decision metric corresponding to the actual transmitted symbols, the metric computer including a combiner circuit operatively coupled to said coherent receiver to generate a combined symbol, and a maximum phase detector operatively coupled to said combined circuit to determine a maximum likelihood from among different phase angles of the combined symbol; and a forward error correction (FEC) decoder, coupled to said metric computer, for decoding the coherent DEPSK modulated signal in accordance with the soft decision metric.

8. An assembly according to claim 7 wherein said combiner circuit comprises:

a mixer operatively coupled to said coherent receiver to combine a present symbol of the coherent DEPSK modulated signal with a present predetermined symbol from a set of predetermined symbols;

a delayer operatively coupled to said coherent receiver to delay the present symbol of the coherent DEPSK modulated signal one time interval and generate a previous symbol of the coherent DEPSK modulated signal; and a summer operatively coupled to said mixer and said delayer to sum the present symbol of the coherent DEPSK modulated signal and the present predetermined symbol with the previous symbol of the coherent DEPSK modulated signal to form the combined symbol.

9. An assembly according to claim 7 wherein said maximum phase detector comprises:

a multiple phase angle circuit operatively coupled to said combiner circuit to provide multiple phase angle representations of the combined symbol over each one of a set of predetermined symbols so as to create a set of likelihoods that a present predetermined symbol is a present one of the actual transmitted symbols; and a maximizer operatively coupled to said multiple phase angle circuit to determine a maximum likelihood from among the set of likelihoods, the maximum likelihood forming a portion of the soft decision metric.

10. An assembly according to claim 9 wherein said multiple phase angle circuit comprises:

a phase rotator operatively coupled to said combiner circuit to rotate the combined symbol over each one of a set of predetermined symbols so as to create a set of likelihoods that a present predetermined symbol is a present one of the actual transmitted symbols; and a real operator operatively coupled to said phase rotator and said maximizer to extract a real portion of each one of the set of likelihoods.

11. A method of decoding a coherent differentially encoded multi-level phase shift keying (DEPSK) modulated signal representing actual transmitted symbols, the method comprising the steps of:

(a) coherently receiving the coherent DEPSK modulated signal;

(b) generating a present predetermined symbol from among a set of predetermined symbols and generating a soft decision metric corresponding to the actual transmitted symbols comprising the coherent DEPSK modulated signal; and (c) outputting the soft decision metric to a forward error correction (FEC) decoder.

12. A method according to claim 11 wherein said step (b) of generating further comprises the substep of:

(b1) combining the present predetermined symbol with a present symbol of the coherent DEPSK modulated signal.

13. A method according to claim 12 wherein said step (b) of generating further comprises the substep of:

(b2) combining the present symbol of the coherent DEPSK modulated signal with a previous symbol of the coherent DEPSK modulated signal to form a resultant symbol necessary to determine the identity of a present one of the actual transmitted symbols.

14. A method according to claim 13 wherein said substep (b) of generating further comprises the substep of:

(b3) rotating the resultant symbol over each one of the set of predetermined symbols so as to create a set of likelihoods that the present predetermined symbol is the present one of the actual transmitted symbols.

15. A method according to claim 14 wherein said step (b) of generating further comprises the substep of:

(b4) extracting the real portion of each one of the set of likelihoods.

16. A method according to claim 14 wherein said step (b) of generating further comprises the substep of:

(b5) determining a maximum likelihood from among the set of likelihoods, the maximum likelihood forms a portion of the soft decision metric.

17. A method of decoding a coherent differentially encoded multi-level phase shift keying (DEPSK) modulated signal representing actual transmitted symbols, the method comprising the steps of:

(a) coherently receiving the coherent DEPSK modulated signal;

(b) generating a soft decision metric corresponding to the actual transmitted symbols comprising the coherent DEPSK modulated signal, said step (b) of generating a soft decision metric comprising the steps of:

(b1) combining a present symbol of the coherent DEPSK modulated signal and a previous symbol of the coherent DEPSK modulated signal to form a combined symbol, and (b2) determining a maximum likelihood from among different phase angles of the combined symbol; and (c) outputting the soft decision metric to a forward error correction (FEC) decoder.

18. A method according to claim 17 wherein said step (b1) comprises the substeps of:

(b1i) mixing the present symbol of the coherent DEPSK modulated signal with a present predetermined symbol from a set of predetermined symbols;

(b1ii) delaying the present symbol of the coherent DEPSK modulated signal to generate the previous symbol of the coherent DEPSK modulated signal; and (b1iii) summing the present symbol of the coherent DEPSK modulated signal and the present predetermined symbol with the previous symbol of the coherent DEPSK modulated signal to form the combined symbol.

19. A method according to claim 17 wherein said step (b2) comprises the substeps of:

(b2i) generating multiple phase angle representations of the combined symbol over each one of a set of predetermined symbols so as to create a set of likelihoods that a present predetermined symbol is a present one of the actual transmitted symbols; and (b2ii) determining a maximum likelihood from among the set of likelihoods, the maximum likelihood forming a portion of the soft decision metric.

20. A method according to claim 19 wherein said step (b2i) comprises the substeps of:

(b2ia) rotating the combined symbol over each one of the set of predetermined symbols so as to create the set of likelihoods that a present predetermined symbol is the present one of the actual transmitted symbols; and (b2ib) extracting a real portion of each one of the set of likelihoods.

21. An assembly for decoding a coherent differentially encoded multi-level phase shift keying (DEPSK) modulated signal representing actual transmitted symbols, the assembly comprising:

a coherent receiver for receiving the coherent DEPSK modulated signal;

a metric computer, coupled to said coherent receiver, for generating a soft decision metric corresponding to the actual transmitted symbols comprising the coherent DEPSK modulated signal, said metric computer further comprising:

a mixer for combining a present symbol of the coherent DEPSK modulated signal with a present predetermined symbol from a set of predetermined symbols to form a rotated symbol;

a delayer for delaying a present symbol of the coherent DEPSK modulated signal one time interval so as to generate a previous symbol of the coherent DEPSK modulated signal;

a summer, coupled to said mixer and said delayer, for summing the rotated symbol and the previous symbol of the coherent DEPSK modulated signal to form a resultant symbol to identify a present one of the actual transmitted symbols;

a phase rotator, coupled to said summer, for rotating the resultant symbol over each one of the set of predetermined symbols so as to create a set of likelihoods that the present predetermined symbol is the present one of the actual transmitted symbols;

a real operator, coupled to said phase rotator, for extracting the real portion of each one of the set of likelihoods that the present predetermined symbol is the present one of the actual transmitted symbols; and a maximizer, coupled to said real operator, for determining a maximum likelihood from among the set of likelihoods, wherein the maximum likelihood forms a portion of the soft decision metric; and a forward error correction (FEC) decoder, coupled to the metric computer, for decoding the coherent DEPSK modulated signal in accordance with said soft decision metric corresponding to the coherent DEPSK modulated signal.

* * * * *